United States Patent
Wang

(10) Patent No.: US 7,768,153 B2
(45) Date of Patent: Aug. 3, 2010

(54) DUAL INPUT POWER SUPPLY

(75) Inventor: Chia Hua Wang, Taipei (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 116 days.

(21) Appl. No.: 11/370,065

(22) Filed: Mar. 8, 2006

(65) Prior Publication Data
US 2007/0069587 A1    Mar. 29, 2007

(30) Foreign Application Priority Data
Sep. 26, 2005    (TW) ................ 94133339 A

(51) Int. Cl.
*H02J 7/00*    (2006.01)
(52) U.S. Cl. .................. 307/66; 307/104
(58) Field of Classification Search .......... 307/72, 307/75, 82, 83, 45, 22, 26, 104, 66; 363/75, 363/142, 143, 123; 327/547; 323/330
See application file for complete search history.

(56) References Cited
U.S. PATENT DOCUMENTS

| | | | | | |
|---|---|---|---|---|---|
| 3,443,198 | A | * | 5/1969 | Wanlass | ........ 363/75 |
| 4,339,792 | A | * | 7/1982 | Yasumura et al. | ........ 363/75 |
| 4,864,478 | A | * | 9/1989 | Bloom | ........ 363/16 |
| 5,250,775 | A | * | 10/1993 | Maehara et al. | ........ 307/72 |
| 6,343,021 | B1 | * | 1/2002 | Williamson | ........ 363/8 |
| 6,650,560 | B2 | * | 11/2003 | MacDonald et al. | ........ 363/142 |
| 7,449,798 | B2 | * | 11/2008 | Suzuki et al. | ........ 307/65 |

* cited by examiner

*Primary Examiner*—Jared J Fureman
*Assistant Examiner*—Daniel Cavallari
(74) *Attorney, Agent, or Firm*—Muncy, Geissler, Olds & Lowe, PLLC

(57) ABSTRACT

A dual input power supply is provided, which comprises a dual input, a connector, a power converter circuit and an output. The dual input has a first input and a second input. The connector is an integrated magnetic element used for integrating the input powers having different power signals from the first input and the second input. The power converter circuit comprises an AC-to-DC converter, a DC-to-DC converter, a feedback circuit and a filter circuit. In the present invention, the dual input uses a set of transformer coils or inductive coils, thus the size of the present power supply can be reduced.

2 Claims, 3 Drawing Sheets

DUAL INPUT POWER SUPPLY

BACKGROUND OF THE INVENTION

1. Field of the Invention

The present invention relates to a dual input power supply, and more particularly to a dual input power supply having an integrated magnetic element.

2. Description of the Related Art

Common electronic devices, such as notebook computer, PDA, and mobile phone, need an AC-to-DC converter to provide the DC power required for the operation of these electronic devices. Typically, in addition to built-in batteries, the AC-to-DC converter is another important power source for these electronic devices.

Recently, the demand for electronic products with high efficiency and low power consumption is gradually increased. It has become an important factor that how to provide these products with a steady power supply and maintain a minimum power consumption. With advancement in semiconductor technology, semiconductor devices, such as MOSFETs, are also increasingly utilized in co-frequency rectifying power devices. As to current products in the market, many co-frequency rectifying driving ICs are available for directly being utilized in power supplying devices. However, these products have a high price and need a complicated control way it is hard to accept them in the market.

U.S. Pat. No. 6,650,560 discloses a programmable dual input AC and DC power supply utilizing a single-loop optical feedback, the dual input AC and DC power supply comprises: a dual input, having a first input and a second input; a connector; a power converter circuit, comprising an AC-to-DC converter, a DC-to-DC booster converter, a filter circuit, a feedback circuit, and a buck converter; and an output, having a first output and a second output. The connector is used for connecting the input powers having different power signals from the first input and the second input. Different cores are used in the connector to connect different power signal inputs. In such a connection way, many complicated components are required, and occupying a large space in the power supply.

Furthermore, with reference to FIG. 4, a DC-to-DC booster converter for a conventional dual input power supply is shown. The conventional DC-to-DC booster converter uses a MOSFET 15 as a synchronous rectifying device. The MOSFET 15 has a body diode 13 such that it is not possible to completely dis-conduct the MOSFET 15, and thus the input can not be isolated from the output and the function of protection is not achieved. The above drawbacks need to be overcome and resolved.

SUMMARY OF THE INVENTION

It is one objective of the present invention to provide a dual input power supply having an integrated magnetic element, in which a dual input uses a set of transformer coils or inductive coils, and thus the size of the power supply can be reduced.

In order to achieve the above objective, a dual input power supply according to the present invention comprises a dual input having a first input and a second input, a connector, a power converter circuit, and an output. The connector is an integrated magnetic element used for connecting different power signal inputs from the first input and the second input.

The first input is provided for an AC power input.

The second input is provided for a DC power input.

The connector is an integrated magnetic element, having magnetic cores and coils.

The connector can be designed in the form of a printed circuit board.

The power converter circuit comprises an AC-to-DC converter, a DC-to-DC converter, a feedback circuit and a filter circuit.

DETAILED DESCRIPTION OF THE PREFERRED EMBODIMENTS

Figure 1:
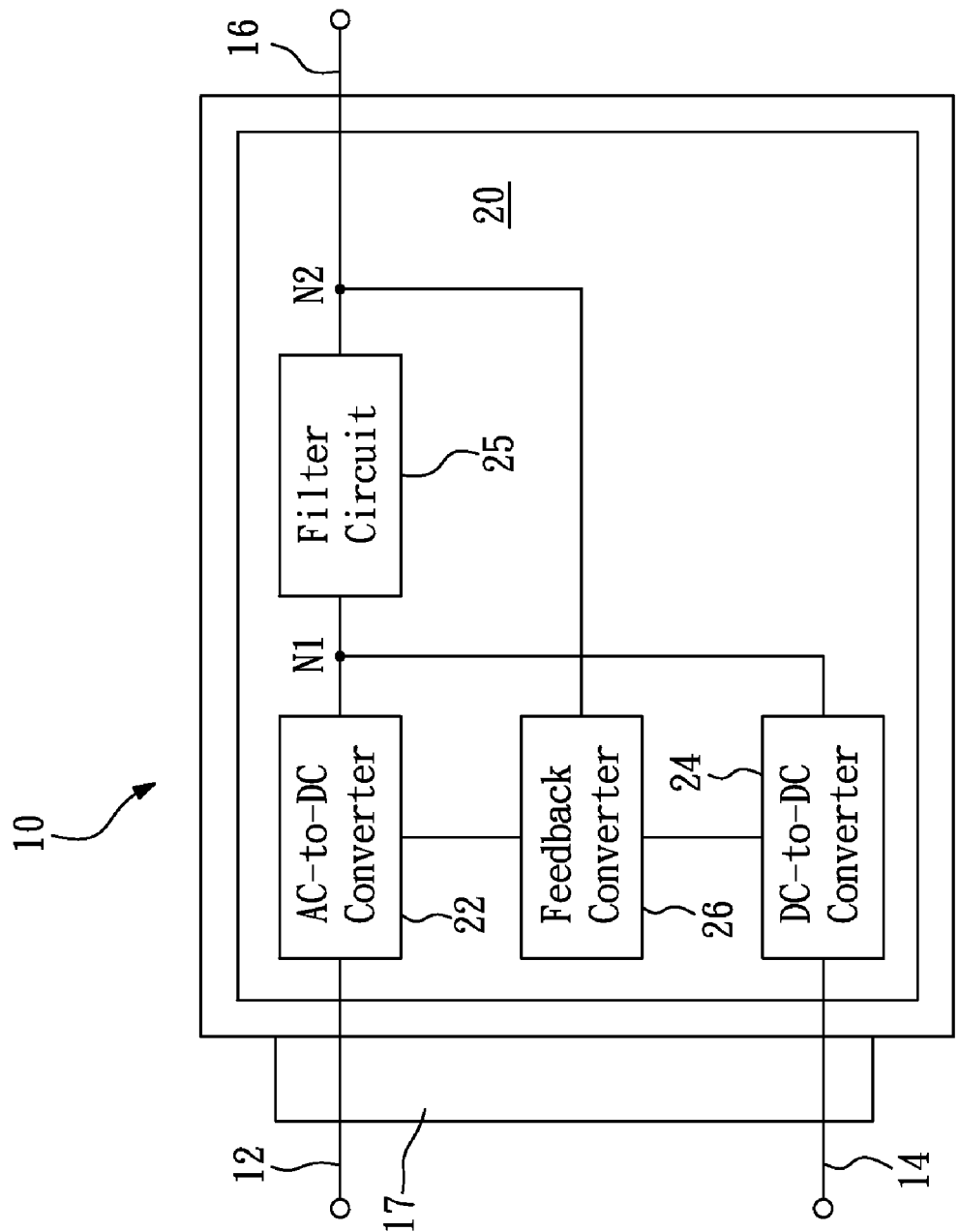
FIG. 1 is a block diagram of a dual input power supply according to the present invention.

Referring to FIG. 1, a block diagram of a dual input power supply according to the present invention is shown. The present dual input power supply 10 comprises a dual input, having a first input 12 and a second input 14; a connector 17 which is an integrated magnetic element; a power converter circuit 20, having an AC-to-DC converter 22, a DC-to-DC converter 24, a filter circuit 25 and a feedback circuit 26; and an output 16.

Continuing referring to FIG. 1, in this embodiment, the first input 12 is provided for an AC power input, the second input 14 is provided for a DC power input. The connector 17 is provided for integrating the input powers having different power signals from the first input 12 and the second input 14, and delivering an AC signal and a DC signal from a first output and a second output respectively. The AC-to-DC converter 22 of the power converter circuit 20 receives the AC signal from the first output and then provides a converted DC voltage at node N1, and the DC-to-DC converter 24 of the power converter circuit 20 receives the DC signal from the second output and then provides a converted DC voltage at node N1. The feedback circuit 26 adjusts the resulting DC output voltage to a steady state by means of the AC-to-DC converter 22 and the DC-to-DC converter 24. And the filter circuit 25 generates a filtered DC voltage at node N2.

Figure 2A:
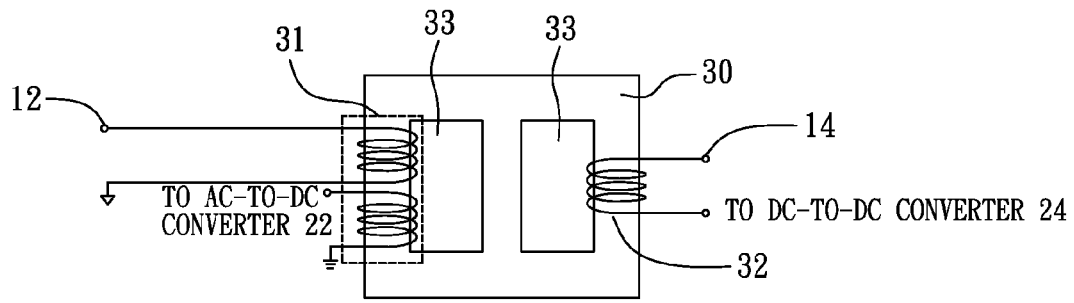
FIG. 2A is one embodiment of the connector of the dual input power supply according to the present invention.

Referring to FIG. 2A, a connector of the dual input power supply according to the present invention is shown. The connector 17 is an integrated magnetic element having a magnetic core 30, a first set of coils (including primary side and secondary side) 31 and an inductive coil 32. The first set of coils 31 can be a set of transformer coils, and the inductive coil 32 can be a single current-resistance inductive coil. The primary side of the first set of coils 31 has a contact serving as the first input 12, and the secondary side of the first set of coils 31 has a contact serving as the first output which is coupled to the AC-to-DC converter 22. The inductor coil 32 has a first contact serving as the second input 14, and a second contact serving as the second output which is coupled to the DC-to-DC converter 24. Two through holes 33 are provided respectively at two sides of the magnetic core 30, and by the through holes 33 the magnetic core 30 becomes a configuration as shown in FIG. 2A. The first set of coils 31 pass through the left-side through hole 33 of the magnetic core 30 and encircle the magnetic core 30, the inductive coil 32 passes through the right-side through hole 33 of the magnetic core 30 and encircles the magnetic core 30, and an integrated magnetic element as shown in FIG. 2A is formed.

Figure 2B:
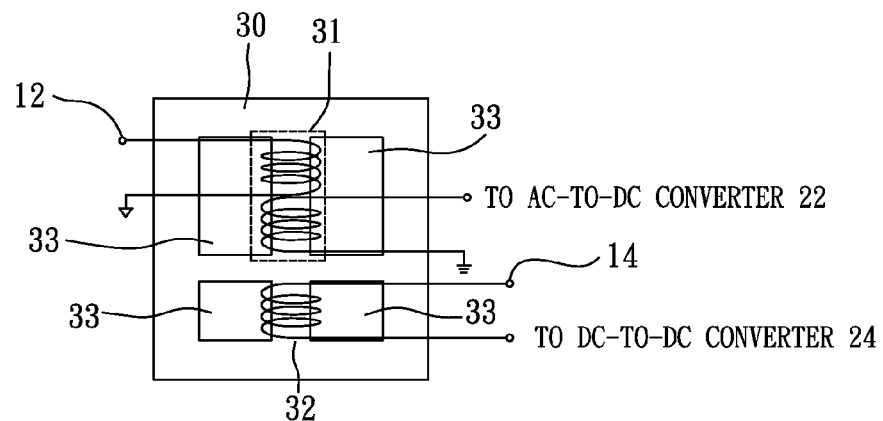
FIG. 2B is another embodiment of the connector of the dual input power supply according to the present invention.

Referring to FIG. 2B, another embodiment of the connector of the dual input power supply according to the present invention is shown. In this embodiment, four through holes 33 are provided on the magnetic core 30, and by the through holes 33 the magnetic core 30 becomes a configuration as shown. The first set of coils 31 pass through the upper two through holes 33 of the magnetic core 30 and encircle the magnetic core 30, the inductive coil 32 passes through the lower through holes 33 of the magnetic core 30 and encircles the magnetic core 30, and an integrated magnetic element as shown in FIG. 2B is formed. As also can be seen in FIG. 2B, the primary side of the first set of coils 31 has a contact serving as the first input 12, and the secondary side of the first set of coils 31 has a contact serving as the first output which is coupled to the AC-to-DC converter 22. The inductor coil 32 has a first contact serving as the second input 14, and a second contact serving as the second output which is coupled to the DC-to-DC converter 24.

Figure 2C:
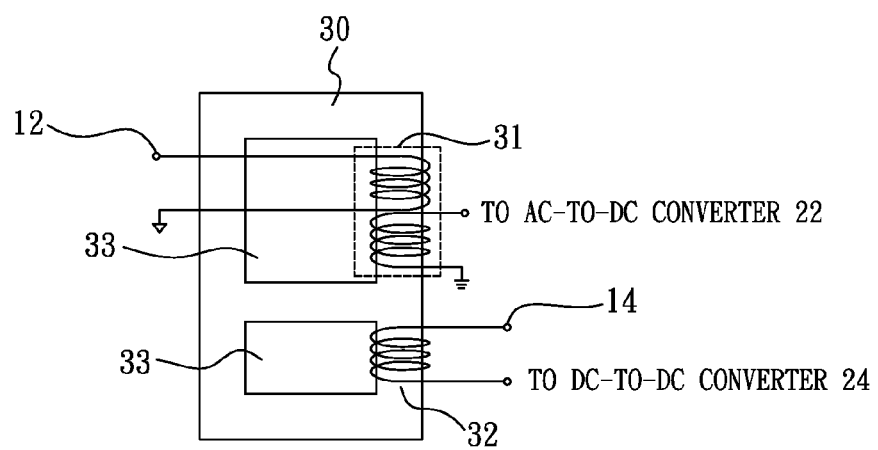
FIG. 2C is still another embodiment of the connector of the dual input power supply according to the present invention.

Referring to FIG. 2C, still another embodiment of the connector of the dual input power supply according to the present invention is shown. In this embodiment, two through holes 33 are provided respectively on the upper and lower portions of the magnetic core 30, and by the through holes 33 the magnetic core 30 becomes a configuration as shown. The first set of coils 31 pass through the upper through hole 33 of the magnetic core 30 and encircle the magnetic core 30, the inductive coil 32 passes through the lower through hole 33 of the magnetic core 30 and encircles the magnetic core 30, and an integrated magnetic element as shown in FIG. 2C is formed. As also can be seen in FIG. 2C, the primary side of the first set of coils 31 has a contact serving as the first input 12, and the secondary side of the first set of coils 31 has a contact serving as the first output which is coupled to the AC-to-DC converter 22. The inductor coil 32 has a first contact serving as the second input 14, and a second contact serving as the second output which is coupled to the DC-to-DC converter 24.

Figure 3:
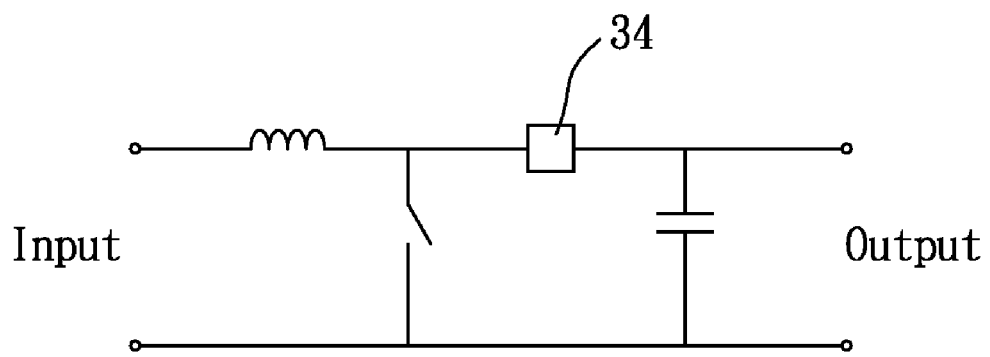
FIG. 3 is a schematic view of a DC-to-DC converter of the power supply according to the present invention.
Figure 4:
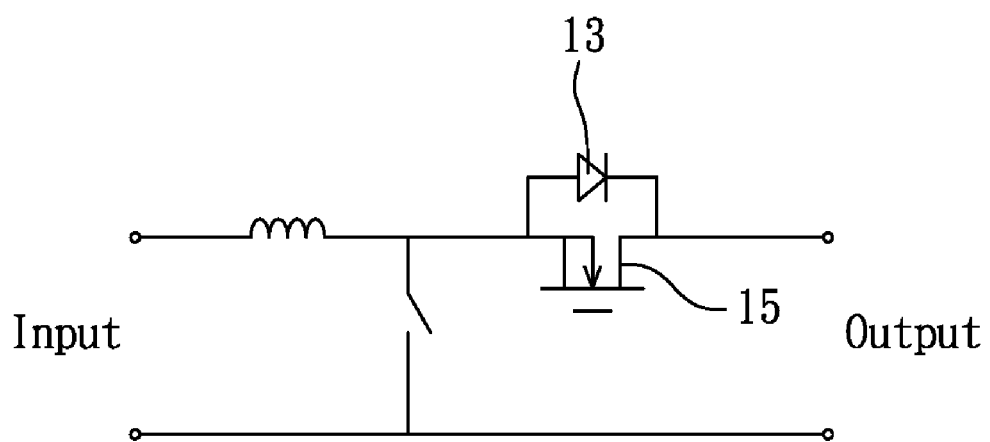
FIG. 4 is a schematic view of a DC-to-DC converter of a conventional power supply.

Referring to FIG. 3, a DC-to-DC converter of the dual input power supply according to the present invention is shown. The DC-to-DC converter 24 of the present invention uses a JFET 34 as an output protection circuit. The JFET 34 has no body diodes, such that the input can be isolated from the output as required to achieve the function of protection, while achieving the function of synchronous rectifying.

Having described the preferred embodiments of this invention, it should be readily apparent to those skilled in the art that various modifications and changes can be made to the invention without departing from the scope and spirit of this invention as defined in the appended claims. Further, this invention is also not limited to the implementations of the embodiments disclosed in this specification. For example, the connector of the present invention can also be designed in the form of a plane type, such as in the form of a printed circuit board.

What is claimed is:

1. A dual input power supply, comprising:
   a dual input, having a first input and a second input; wherein said first input and said second input are separate and for connecting external sources; and wherein said first input is provided for an AC power input and said second input is provided for a DC power input;
   a connector;
   a power converter circuit; which comprises an AC-to-DC converter, a DC-to-DC converter, a feedback circuit, and a filter circuit; and
   an output;
   wherein said connector is an integrated magnetic element used for connecting different power signal inputs from said first input and said second input and providing an AC signal and a DC signal from a first output and a second output respectively;
   said integrated magnetic element comprises a magnetic core, a first set of coils, and an inductive coil;
   said first set of coils and said inductive coil share said magnetic core;
   said first set of coils comprise a primary side coil and a secondary side coil, said primary side coil having a contact serving as said first input, and said secondary side coil having a contact serving as said first output coupled to said AC-to-DC converter;
   said inductive coil has a first contact serving as said second input, and a second contact coupled to said DC-to-DC converter;
   said DC-to-DC converter comprises a JFET as an output protection circuit; and
   said first set of coils comprise a set of transformer coils and said inductive coil comprises a single current-resistance inductive coil.

2. The dual input power supply of claim 1, wherein said connector is designed in a form of a printed circuit board.

* * * * *